May 13, 1958   J. E. CARSON   2,834,338
DEVICE FOR MEASURING BLOOD DENSITY IN TISSUE
Filed Nov. 16, 1954
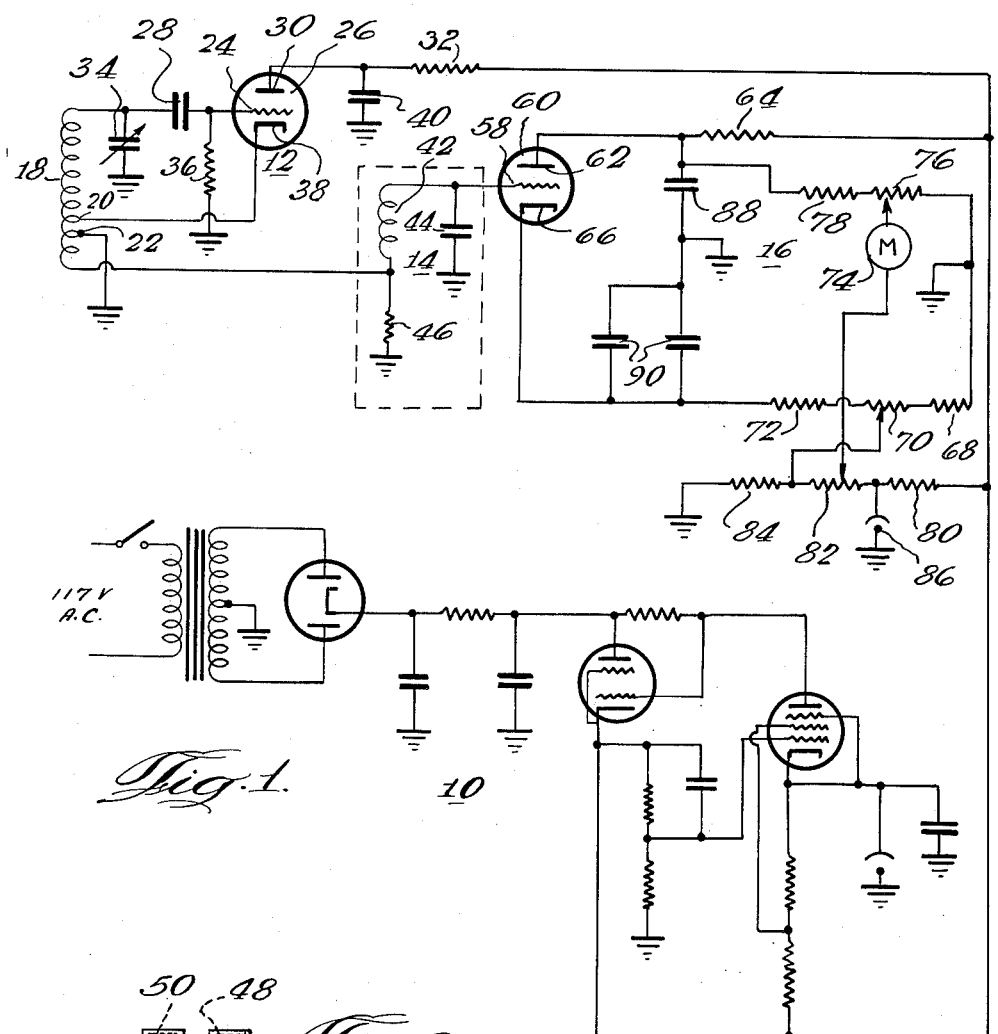
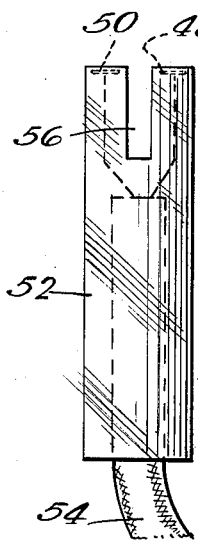
Fig. 1.
Fig. 2.
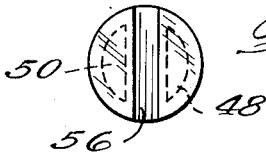
Fig. 3.
Inventor
James E. Carson
By Alois W. Graf
Attorney

United States Patent Office 2,834,338
Patented May 13, 1958

2,834,338

DEVICE FOR MEASURING BLOOD DENSITY IN TISSUE

James E. Carson, Denver, Colo., assignor, by mesne assignments, to Hamilton Watch Company, Lancaster, Pa., a corporation of Pennsylvania Application November 16, 1954, Serial No. 469,140

6 Claims. (Cl. 128—2)

The present invention relates to devices for determining the amount of blood in a given quantity of tissue, particularly the amount of blood in the pulmonary system of the human body.

It has been observed that some diseases result in a change in the amount of blood in a given quantity of tissue in certain portions of the body. This is in general equivalent to a change in blood pressure, since the amount of blood in a given quantity of tissue is determined in part by the blood pressure. This is also true in both human beings and animals, and is particularly true of the pulmonary system including the lungs. For example, tuberculosis of the lungs results in a decreased amount of blood in localized areas of the lungs, these areas being the areas of the lung most severely affected by the disease.

Direct methods for determining the density of blood in other tissue have been impeded because the method used must not destroy or injure the tissue under measurement. It is therefore an object of the present invention to provile a non-destructive device for directly measuring the ratio of the quantity of blood to the quantity of other tissue in a given tissue region.

The inventor has found that a probe can be inserted through an aperture provided in the chest of the body under measurement and placed in contact within the lung to obtain a measurement of the amount of the blood in the lung tissue. In this manner an electrostatic field can be made to penetrate the lung tissue, and the dielectric properties of the lung tissue can be utilized to obtain a measurement of the amount of blood in the lung tissue. It is thus a further object of the present invention to provide a device for directly measuring the dielectric properties of tissue.

The inventor has found that the relatively small changes in the density of lung tissue due to varying amounts of blood provide a significant change in the power factor of this material when it is used as a dielectric. It is therefore also an object of the present invention to provide a device for directly measuring the power factor of lung tissue with different amounts of blood therein when the lung tissue is used as a dielectric.

One method for measuring power factors of dielectrics is to utilize the dielectric in a capacitotr connected in a resonant circuit, and measure the Q of the resonant circuit. Changes in the power factor of the dielectric appear as changes in the effective resistance of the resonant circuit in such a construction. It is therefore a further object of the present invention to provide a simple and accurate device for measuring the Q of a resonant circuit with a capacitance adapted to use the tissue under measurement as a dielectric.

Most devices for measuring Q utilize a series resonant circuit, a radio frequency oscillator coupled to the resonant circuit, and means to measure the R. F. potential developed across the coil or capacitor of the resonant circuit. As a result, such devices are inherently subject to the instability of the oscillator output potential. Therefore it is a further object of the present invention to provide a device for measuring the Q of a resonant circuit which is independent of the output potential of the oscillator used to resonate the circuit.

Other and further objects of the present invention will become readily apparent to the man skilled in the art from a further reading of the present disclosure, particularly when viewed in the light of the drawings, in which:

Figure 1 is a schematic circuit diagram of a device for measuring the dielectric loss factor of lung tissue which illustrates the present invention;

Figure 2 is a longitudinal sectional view of the probe illustrated schematically as a portion of the device in Figure 1; and Figure 3 is an end elevational view of the probe illustrated in Figure 2.

Figure 1 shows a voltage regulated power supply 10, an R. F. oscillator 12, a series resonant circuit 14, and a measuring circuit 16 for measuring the voltage developed in the testing circuit 14. The voltage regulated power supply 10 is designed to convert the 110 volt A. C. generally available from power lines to a stable direct current, and is of general conventional construction. The voltage regulated power supply will not be further described for this reason.

The oscillator 12 is of the conventional Hartley design. It utilizes a coil 18 having a pair of taps 20 and 22 near one end of the coil, the other end of the coil 18 being connected to a control grid 24 of a vacuum tube 26 through a coupling condenser 28. The positive terminal of the power supply 10 is connected to a plate 30 of vacuum tube 26 through a plate resistor 32, and the negative terminal of the power supply 10 is connected to the tap 22 which is connected to the coil 18 at a point between the tap 20 and the adjacent end of the coil. A variable capacitor 34 is connected between the tap 22 and the end of the coil 18 which is coupled to the grid 24 of the tube 26 for the purpose of varying the frequency of oscillation of the oscillator 12. A grid resistor 36 is also connected between the tap 22 and the grid 24 to supply a proper grid bias voltage to the tube 26. The tap 20 adjacent to the tap 22 is connected to a cathode 38 of the vacuum tube 26. A R. F. bypass condenser 40 is connected between the plate 30 and tap 22 to prevent the R. F. generated by the oscillator 12 from entering the voltage regulated power supply 10.

The end of the coil 18 adjacent to the tap 22 is connected to the measuring circuit 14. The measuring circuit comprises a coil 42 and a capacitive probe 44 connected in a series circuit with the portion of coil 18 between the tap 22 and the adjacent end of the coil 18, and the resistance of the circuit, designated 46. One end of the coil 42 is directly connected to the end of the coil 18 of the oscillator 12, the portion of the coil between the end and the tap 22 being used to couple the resonant circuit 14 to the oscillator 12.

The capacitive probe 44 comprises a pair of spaced electrically conducting plates 48 and 50 lying in a single plane. The plates 48 and 50 are disposed within an electrically insulating housing 52 which may be constructed of polystyrene plastic. A coaxial cable 54 is electrically connected to the plates 48 and 50 and exits from the end of the housing 52 opposite to the plates 48 and 50. The plates 48 and 50 are disposed very close to the end of the housing 52, thereby providing only a thin envelope to electrically insulate the plates 48 and 50 from any material placed adjacent to this end of the housing 52. A slot 56 is disposed in the space between the plates 48 and 50 and extends into the housing 52. The plates 48 and 50, however, are electrically insulated from the exterior of the housing at all points including the surfaces of the slot 56.

In a particular construction of the probe 44, the housing 52 has a diameter of approximately 1½ inches and the slot 56 extends axially into the housing 52 a distance of approximately 1 inch and is approximately ¼ inch thick. The plates 48 and 50 are constructed of brass and are oval in shape, the plates being approximately 1 inch along their major axis and approximately ⅜ inch across their minor axis. The plates are separated from each other by approximately ⅜ of an inch, are approximately 1/64 of an inch thick, and are disposed approximately 1/32 of an inch beneath the surface of the housing 52.

The resonant circuit 14 is connected to a grid 58 of vacuum tube 60 of the measuring circuit 16. Vacuum tube 60 also has a plate 62 which is connected to the positive terminal of the power supply 10 through a plate resistor 64. The negative terminal of the power supply 10 is connected to a cathode 66 of vacuum tube 60 through three resistors, 68, 70 and 72 connected in series. The middle resistor 70 of the three resistors is a tapped variable resistor, and the tap of the resistor 70 is connected to a meter 74 through a voltage balancing network, described below. The other terminal of the meter 74 is connected to the tap of a variable resistor 76 which is connected between the negative terminal of the power supply 10 and the plate 62 of vacuum tube 60.

A source of voltage sufficient to overcome the voltage drop across resistor 78 and the portion of resistor 76 between resistor 78 and its tap is connected between the meter 74 and the tap of resistor 70. This source of potential includes resistors 80, 82 and 84 connected in series between the positive and negative terminals of the power source 10, the center resistor 82 having a variable tap directly connected to the meter 74. The junction between resistors 82 and 84 is connected to the tap of resistor 70. A voltage regulator tube 86 is connected between the junction of resistors 80 and 82 and the negative terminal of the power source 10 to maintain constant the potential inserted to buck out the voltage drop developed across resistors 78 and the portion of resistor 76 between resistors 78 and the tap of resistor 76. The plate 62 of vacuum tube 60 is by-passed by condenser 88, and the cathode 66 of vacuum tube 60 is by-passed by condensers 90.

When the circuit is in operating condition, the output of oscillator 12 is tuned to the resonant frequency of the resonant circuit 14 by variation of the tuning condenser 34, the probe 44 of the testing circuit being disposed in the ambient atmosphere at least 6 inches from adjacent objects. As a result, the maximum potential which the oscillator 12 will be able to develop across the resonant circuit 14 will occur. Under these conditions the potential difference appearing across the plate 62 and cathode 66 of vacuum tube 60 will be a minimum due to the potential drop across plate resistor 64. For calibration purposes, the meter 74 is then connected directly to the tap of resistor 70, thus removing the bucking voltage developed across resistor 82 from the meter circuit. Resistor 76 is then adjusted to cause the meter 74 to read zero current with the tap of resistor 70 approximately in the middle. The meter 74 is then again connected to the tap of resistor 82, and the junction between resistors 82 and 84 is connected to the tap of resistor 70, as illustrated in Figure 1, in order to insert the bucking voltage into the circuit. The tap of resistor 82 is then moved to cause the meter 74 to read maximum current. The circuit is then ready for use.

When the capacitive probe 44 is placed in contact with tissue, the dielectric between the plates 48 and 50 of the probe 44 is changed from air to the tissue itself. As a result, the Q of the resonant circuit 14 is changed. Since the potential across the resonant circuit 14 will be less than when the dielectric between the plates 48 and 50 of the probe 44 did not include tissue, the potential appearing across the plate 62 and cathode 66 of vacuum tube 60 will increase, thereby causing the meter 74 to give an indication of the change in this potential. It is to be noted that the measurement of the Q of the testing circuit 14 is independent of the amplitude of the oscillations from the oscillator 12, since the oscillation voltage is entirely offset by the bucking voltage developed across a portion of resistor 82. As a result, no compensation or measurement of the amplitude of the output of oscillator 12 need be made.

It is also to be noted that the amount of blood in a very restricted area of a lung, or other tissue, relative to the quantity of tissue encompassed by the face of the probe 44, may readily be determined by merely placing the probe 44 adjacent to this area. Since additional capacity effects will be observed if the tissue is electrically connected to ground, the tissue, or the patient, should be electrically insulated from ground.

In the particular construction of the device herein disclosed, the oscillator 12 is designed to operate throughout a frequency of 2 to 5 megacycles. The coil 42 of the resonant circuit 14 has an inductance of approximately 160 micro henrys and is utilized with the probe described above. The internal resistance 46 of the testing circuit 14 is approximately 1 ohm, although internal resistances of up to 2 ohms may be tolerated.

Observations of the inventor with the foregoing device indicate that the normal lung ranges between approximately 50 and 85 units, the larger the blood density in the lung the higher the number. The heart has a greater unit number than that of a lung and exceeds 90. The inventor has also found that the unit number decreases with increases in air pressure in the lung, typical readings for a normal living lung being 83 at 5 mm. of Hg within the lung, 75 at 10 mm. of Hg, and 73 at 15 mm. of Hg.

The foregoing disclosure of the device for determining the amount of blood in a given amount of tissue has been specific. The man skilled in the art will readily devise many other uses and devices which are within the scope of the present invention. It is therefore intended that the invention be not limited to the foregoing disclosure, but rather only by the appended claims.

What is claimed is:

1. A device for measuring the amount of blood in a given quantity of tissue comprising a capacitor having a pair of electrically-conducting spaced plates, means including an electrically insulating housing for retaining said plates in spaced relationship and for providing a thin envelope of insulation over the outer surfaces of the plates, and means connected to the capacitor to measure the power factor of the dielectric of the capacitor whereby the amount of blood in a given quantity of tissue may be determined by placing the tissue in contact with the electrically insulating housing adjacent to the capacitor plates.

2. A device for measuring the amount of blood in a given quantity of tissue comprising a circuit including a coil and a capacitor having a pair of spaced plates lying in a single plane, an electrically insulating envelope disposed about the plates, and means connected to the circuit to measure the Q of the circuit, whereby the amount of blood in a given quantity of tissue may be determined by pressing the tissue against the insulating envelope adjacent to the capacitor and measuring the Q of the circuit.

3. A device for measuring the amount of blood in a given quantity of tissue comprising a circuit having a coil and a condenser having a pair of spaced plates, an electrically insulating envelope disposed about the plates, said envelope having a flat surface confronting the condenser plates and a slot therein disposed in the space between the condenser plates, and means to measure the Q of the circuit, whereby the amount of blood in a given quantity of tissue may be determined by pressing the tissue under measurement against the insulating envelope.

4. A device for measuring the amount of blood in a given quantity of tissue comprising a circuit having a coil of approximately 160 micro henrys and a capacitive probe connected across the coil, said probe having a capacity of approximately 10 micro micro farads and comprising a pair of spaced plates lying in a single plane and a thin electrically insulating envelope thereover, said insulating envelope having a flat surface confronting the plates and a slot therein disposed in the space between the plates, and means to measure the Q of the resonant circuit, whereby changes in Q caused by pressing tissue against the insulating envelope may be determined.

5. A device for measuring the amount of blood in a given quantity of tissue comprising a series circuit including a coil and a condenser having a pair of spaced plates lying in a single plane and a thin electrically insulating envelope thereover, means for measuring the Q of the circuit comprising a variable frequency oscillator coupled in series with the resonant circuit, and means to measure the ratio of the R. F. voltage developed in the circuit with the condenser adjacent to the tissue under measurement to the R. F. voltage of the circuit with the condenser disposed in the ambient atmosphere.

6. A device for measuring the amount of blood in a given quantity of tissue comprising the elements of claim 5 where the means to measure the ratio of the R. F. voltage across the circuit with the condenser adjacent to the tissue under measurement to the R. F. voltage of the circuit with the condenser disposed in the ambient atmosphere includes a vacuum tube having a plate, grid, and plate return electrode, the condenser of the circuit being connected between the grid and plate return electrode, a source of electrical power connected between the plate and plate return electrode, a resistor connected between the plate and source of power, and a metering circuit connected between the plate and plate return electrode including a resistor, a source of voltage equal and opposite to the voltage drop across the resistor when the circuit condenser is disposed in the ambient atmosphere, and a meter to measure the current in the metering circuit, whereby the meter will measure zero current when the condenser is in the ambient atmosphere and will measure a current when the condenser is disposed adjacent to the tissue under measurement.

References Cited in the file of this patent

UNITED STATES PATENTS

| | | |
|---|---|---|
| 2,352,011 | Rosa | June 20, 1944 |
| 2,413,389 | Smith | Dec. 31, 1946 |